United States Patent
Rezk et al.

(10) Patent No.: US 12,388,499 B2
(45) Date of Patent: Aug. 12, 2025

(54) UPLINK MULTI-USER MULTIPLE-INPUT MULTIPLE-OUTPUT (UL MU-MIMO) PRECODING USING PER-STATION FEEDBACK

(71) Applicant: QUALCOMM Incorporated, San Diego, CA (US)

(72) Inventors: Meriam Rezk, Campbell, CA (US); Deniz Rende, San Jose, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/408,505

(22) Filed: Jan. 9, 2024

(65) Prior Publication Data
US 2025/0226858 A1    Jul. 10, 2025

(51) Int. Cl.
*H04B 7/0452* (2017.01)
*H04B 7/0426* (2017.01)
*H04B 7/0456* (2017.01)

(52) U.S. Cl.
CPC ........... *H04B 7/0452* (2013.01); *H04B 7/043* (2013.01); *H04B 7/046* (2013.01)

(58) Field of Classification Search
CPC ....... H04B 7/0452; H04B 7/043; H04B 7/046
See application file for complete search history.

(56) References Cited

U.S. PATENT DOCUMENTS

| 10,158,413 B2 * | 12/2018 | Moon | H04B 7/0639 |
| 11,405,084 B1 * | 8/2022 | Changlani | H04L 5/0048 |
| 2023/0319851 A1 | 10/2023 | Shilo et al. | |

OTHER PUBLICATIONS

International Search Report and Written Opinion—PCT/US2024/059906—ISA/EPO—Mar. 17, 2025.

* cited by examiner

*Primary Examiner* — Vineeta S Panwalkar
(74) *Attorney, Agent, or Firm* — Kevin M. Donnelly; Avek IP, LLC

(57) ABSTRACT

Various aspects relate generally to wireless communication and more particularly to beamforming techniques in wireless communication networks. Some aspects more specifically relate to beamforming techniques for uplink MU-MIMO communications, and the techniques can include UL MU-MIMO precoding using per-STA feedback. In some examples, an AP can support STA-side precoding for UL MU-MIMO communications by providing STAs with feedback representative of unitary matrices that correspond to block diagonal components of a matrix projection of channel matrices for the STAs in accordance with a linear equalizer. In some examples, the AP can trigger the STAs to transmit sounding packets concurrently, but can use the block diagonal matrix projection to process the various STAs' channels independently.

30 Claims, 9 Drawing Sheets

UPLINK MULTI-USER MULTIPLE-INPUT MULTIPLE-OUTPUT (UL MU-MIMO) PRECODING USING PER-STATION FEEDBACK

TECHNICAL FIELD

This disclosure relates generally to wireless communication, and more specifically, to beamforming techniques for wireless communications.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, APs and STAs can transmit and receive wireless communications using multiple antennas. In order to increase the reliability and/or speed of wireless communications between them, APs and STAs can implement beamforming techniques. Such beamforming techniques can include techniques according to which STAs may apply precoding coefficients in order to beamform uplink multi-user multiple-input multiple-output (UL MU-MIMO) communications with APs.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless access point (AP). The wireless AP includes a processing system that includes processor circuitry and memory circuitry that stores code, the processing system configured to cause the wireless AP to transmit a first packet that indicates to each of a plurality of wireless stations (STAs) to transmit an uplink (UL) sounding packet, receive, in association with the transmission of the first packet, a plurality of sounding packets from the plurality of wireless STAs, respectively, and transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA In some examples, the processing system can be further configured to cause the wireless AP to perform the measurements of the plurality of sounding packets over a plurality of subcarriers, obtain a respective channel matrix for each of the plurality of subcarriers in accordance with the measurements, obtain a respective projection of each channel matrix for each of the plurality of wireless STAs in accordance with a respective linear equalizer, and obtain the one or more respective unitary precoder matrices associated with each of the plurality of wireless STAs in accordance with respective block diagonal components of the respective projections. In some examples, the processing system can be further configured to cause the wireless AP to compress the one or more respective unitary precoder matrices associated with each of the plurality of wireless STAs using a respective Givens rotation operation to generate respective angles, wherein the per-STA UL beamforming feedback includes the respective angles.

Another innovative aspect of the subject matter described in this disclosure can be implemented in a method for wireless communication by a wireless AP. The method includes transmitting a first packet that indicates to each of a plurality of wireless stations (STAs) to transmit an uplink (UL) sounding packet, receiving, in association with the transmission of the first packet, a plurality of sounding packets from the plurality of wireless STAs, respectively; and transmitting a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

In some examples, the method can include performing the measurements of the plurality of sounding packets over a plurality of subcarriers, obtaining a respective channel matrix for each of the plurality of subcarriers in accordance with the measurements, obtaining a respective projection of each channel matrix for each of the plurality of wireless STAs in accordance with a respective linear equalizer, and obtaining the one or more respective unitary precoder matrices associated with each of the plurality of wireless STAs in accordance with respective block diagonal components of the respective projections. In some examples, the method can further comprise compressing the one or more respective unitary precoder matrices associated with each of the plurality of wireless STAs using a respective Givens rotation operation to respective generate respective angles, wherein the per-STA UL beamforming feedback includes the respective angles.

Another innovative aspect of the subject matter described in this disclosure can be implemented in an apparatus. The apparatus includes means for transmitting a first packet that indicates to each of a plurality of wireless stations (STAs) to transmit an uplink (UL) sounding packet, means for receiving, in association with the transmission of the first packet, a plurality of sounding packets from the plurality of wireless STAs, respectively; and means for transmitting a second packet frame that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA, means for performing the measurements of the plurality of sounding packets over a plurality of subcarriers, means for obtaining a respective channel matrix for each of the plurality of subcarriers in accordance with the measurements, means for obtaining a respective projection of each channel matrix for each of the plurality of wireless STAs in accordance with a respective linear equalizer; and means for obtaining the one or more respective unitary precoder matrices associated with each of the plurality of wireless STAs in accordance with respective block diagonal components of the respective projections.

Another innovative aspect of the subject matter described in this disclosure can be implemented in non-transitory computer-readable medium storing instructions for communication by a wireless access point (AP). The instructions including code to transmit a first packet that indicates to each of a plurality of wireless stations (STAs) to transmit an uplink (UL) sounding packet, receive, in association with the transmission of the first packet, a plurality of sounding packets from the plurality of wireless STAs, respectively, and transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
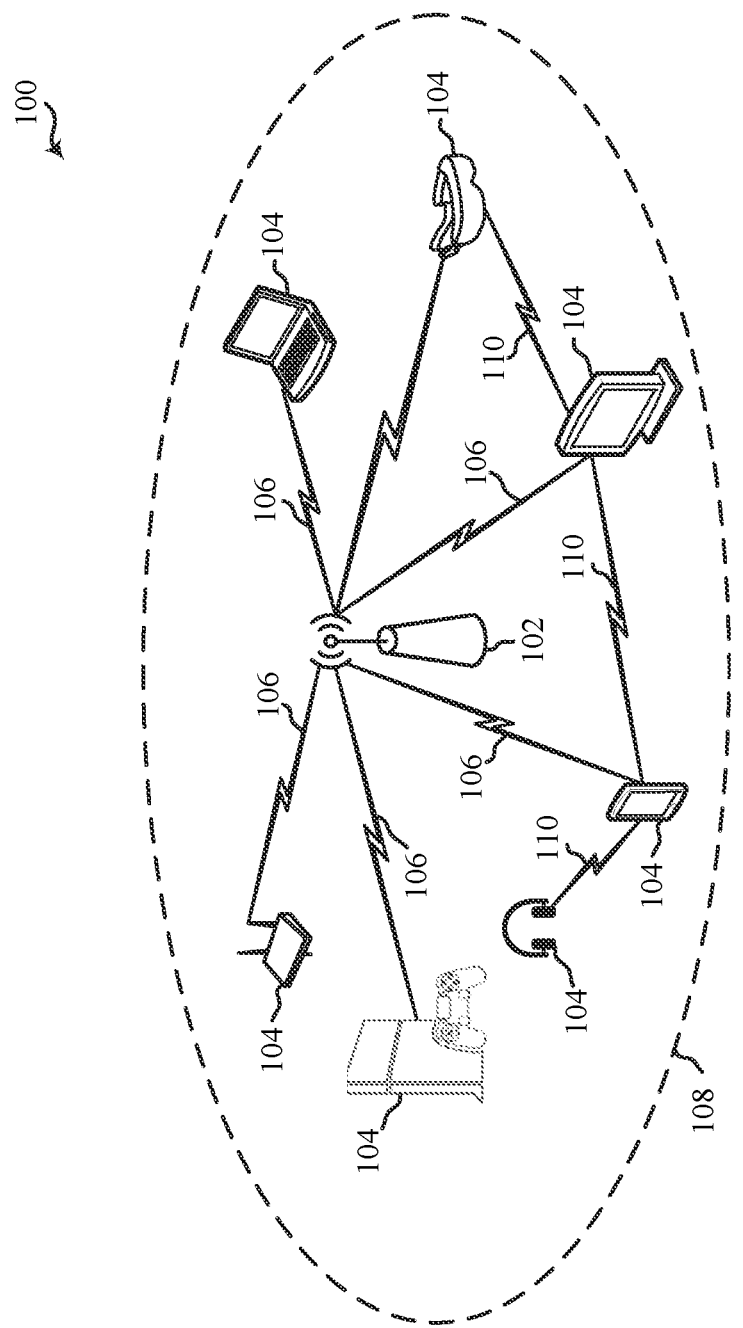
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to beamforming techniques in wireless communication networks. Some aspects more specifically relate to beamforming techniques for uplink (UL) MU-MIMO precoding in accordance with per-wireless station (STA) feedback representative of one or more respective unitary precoder matrices for each STA. In some examples, an access point (AP) can support STA-side precoding for UL MU-MIMO communications by providing each of a plurality of STAs with one or more respective unitary precoder matrices, or compressed angular representation of the one or more respective unitary precoder matrices, that corresponds to a subspace basis of a respective block diagonal component of modified channel matrices for subcarriers of a wireless channel. in which the modified channel matrix for each subcarrier projects a channel equalizer matrix for a channel associated with that subcarrier onto a estimated channel matrix associated with that subcarrier. In some examples, the channel equalizer matrix for a subcarrier may comprise a pseudo-inverse of the estimated channel matrix for the subcarrier. In some examples, the channel equalizer matrix for a subcarrier may comprise a regularized minimum mean square error (MMSE), or linear equalizer, of the estimated channel matrix for the subcarrier. In some examples, the AP can trigger the STAs to transmit UL sounding packets concurrently, but, by basing a number of long training fields (LTFs) in the trigger frame on a number of antennas received from each of the plurality of STAs (for example, in a capability exchange), can use null space or an equivalent to reduce inter-user and inter-stream interference, enabling individual streams to be processed and interference mitigated so that the AP can cause a plurality of STAs to transmit their sounding packets simultaneously. In some examples, the respective feedback representative of one or more respective unitary precoder matrices provided to each of the STAs may comprise compressed beamforming feedback that represents the one or more respective unitary precoder matrices. In some examples, the AP can use an existing format, such as a single-user compressed beamforming feedback (SU-CBF) format defined in IEEE 802.11ac, 802.11ax, or 802.11be, to provide each of a plurality of STAs with feedback representative of its one or more respective unitary precoder matrices. However, because feedback for the plurality of STAs may be determined jointly and therefore may not be modified in the same manner as SU-CBF, some examples may include an indication to each of the plurality of STAs (for example, in the trigger frame or a subsequent frame) of a modification restriction for using its one or more respective unitary precoder matrices. In some examples, the AP can use multi-user compressed beamforming (MU-CBF) In some examples, the compressed beamforming feedback for each STA can represent the application of compressed beamforming feedback matrix to the output of an SVD, Eigen Value Decomposition (EVD) or QR decomposition.

Particular aspects of the subject matter described in this disclosure can be implemented to realize one or more of the following potential advantages. In some examples, the use of null space or an equivalent by an AP in the joint determination of feedback for a plurality of STAs in MU-MIMO precoding can reduce the computational costs to the AP associated with determining precoding coefficients. The disclosed techniques may also accommodate significant re-use of functional blocks of existing AP designs, such as singular value decomposition (SVD), compressed V matrix (Cmp-V) formatting, and the like. By providing feedback to a plurality of STAs representative of one or more respective unitary precoder matrices for each STA, the AP can reduce overhead and leverage existing compression techniques and existing feedback formatting (such as SU-CBF), to provide efficient UL MU-MIMO beamforming feedback without imposing new requirements on STAs that already support UL MU-MIMO communications and beamforming.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Figure 2:
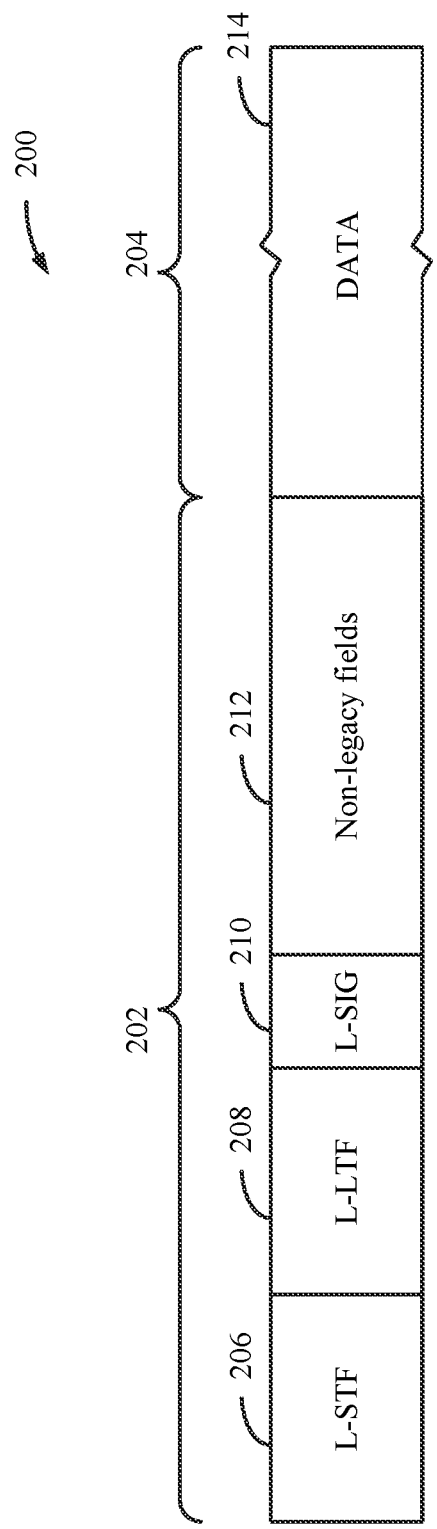
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as AP 102 or STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
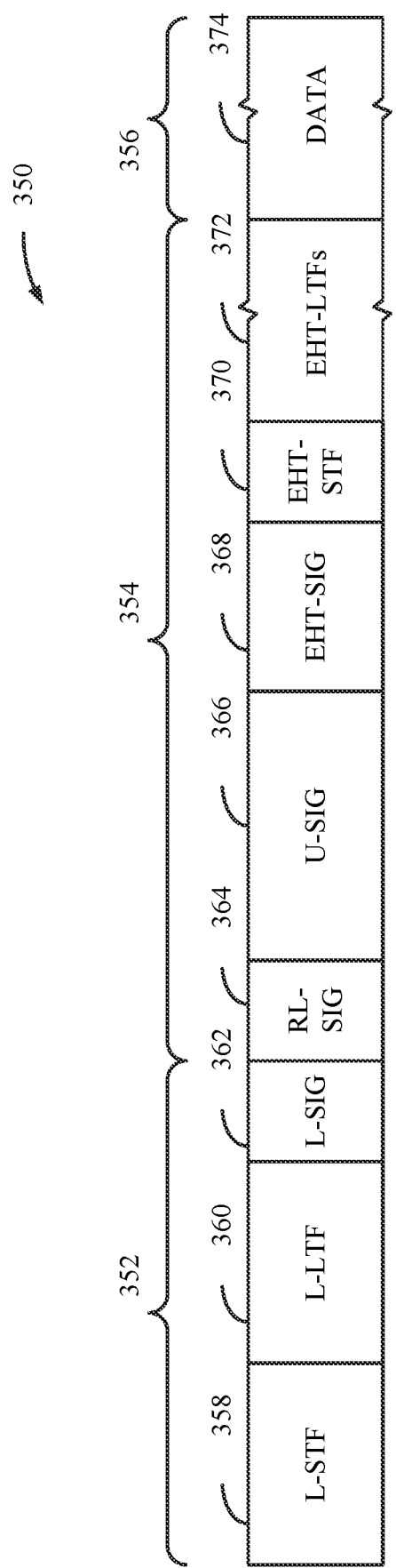
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
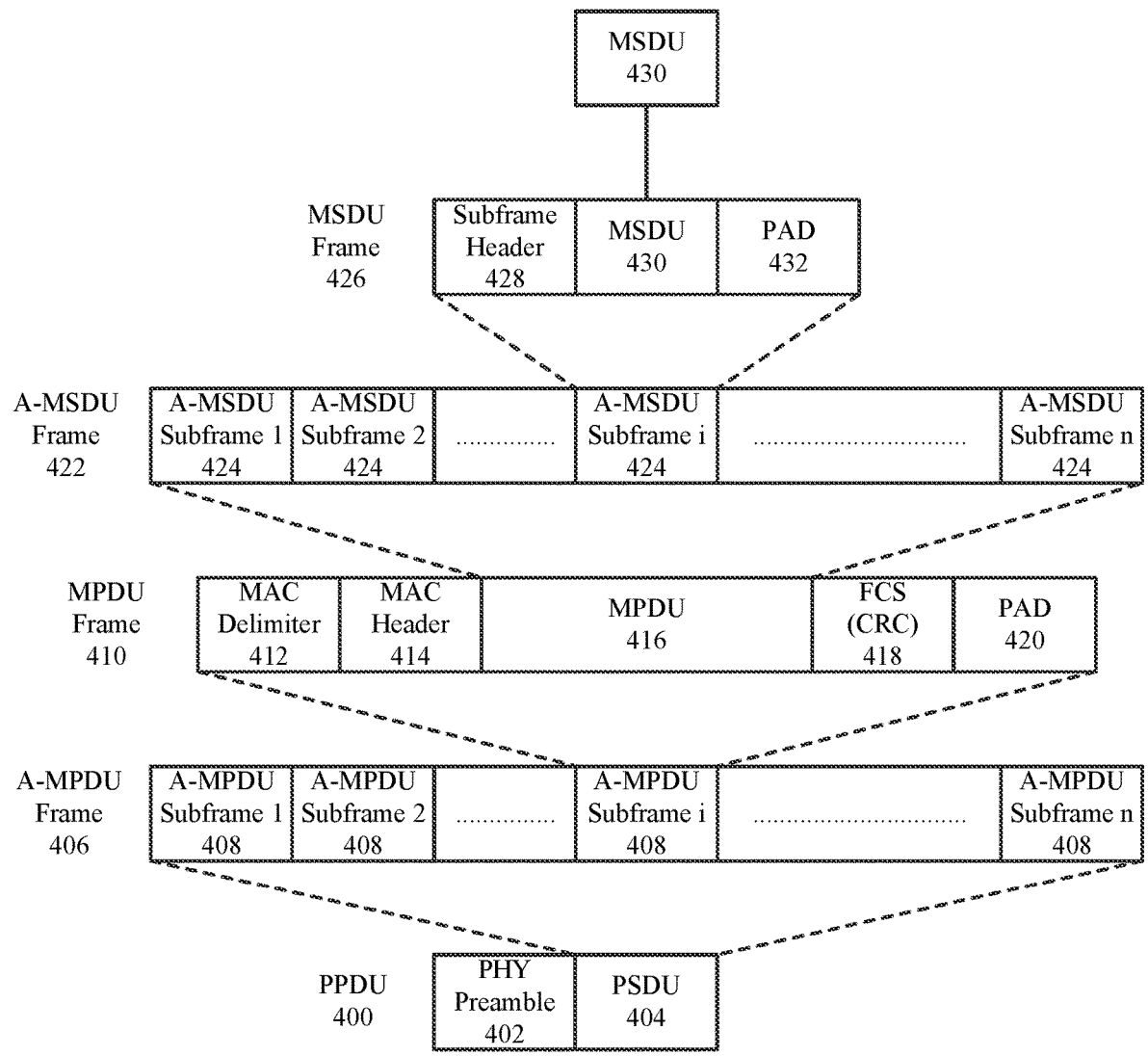
FIG. 4 shows a hierarchical format of an example PPDU usable for communications between a wireless AP and one or more wireless STAs.

FIG. 4 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

APs and STAs (for example, the AP 102 and the STAs 104 described with reference to FIG. 1) that include multiple antennas may support various diversity schemes. For example, spatial diversity may be used by one or both of a transmitting device (such as either AP 102 or STA 104) or a receiving device (such as either AP 102 or STA 104) to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are then mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas.

APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally or alternatively involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may then perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may then generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP 102's spatial multiplexing capability, an AP 102 may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For example, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some examples, multiple APs 102 may simultaneously transmit signaling or communications to a single STA 104 utilizing a distributed MU-MIMO scheme. Examples of such a distributed MU-MIMO transmission include coordinated beamforming (CBF) and joint transmission (JT). With CBF, signals (such as data streams) for a given STA 104 may be transmitted by only a single AP 102. However, the coverage areas of neighboring APs may overlap, and signals transmitted by a given AP 102 may reach the STAs in OBSSs associated with neighboring APs as OBSS signals. CBF allows multiple neighboring APs to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. Accordingly, the APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

In some implementations, the AP 102 and STAs 104 can support various multi-user communications; that is, concurrent transmissions from one device to each of multiple devices (for example, multiple simultaneous downlink communications from an AP 102 to corresponding STAs 104), or concurrent transmissions from multiple devices to a single device (for example, multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
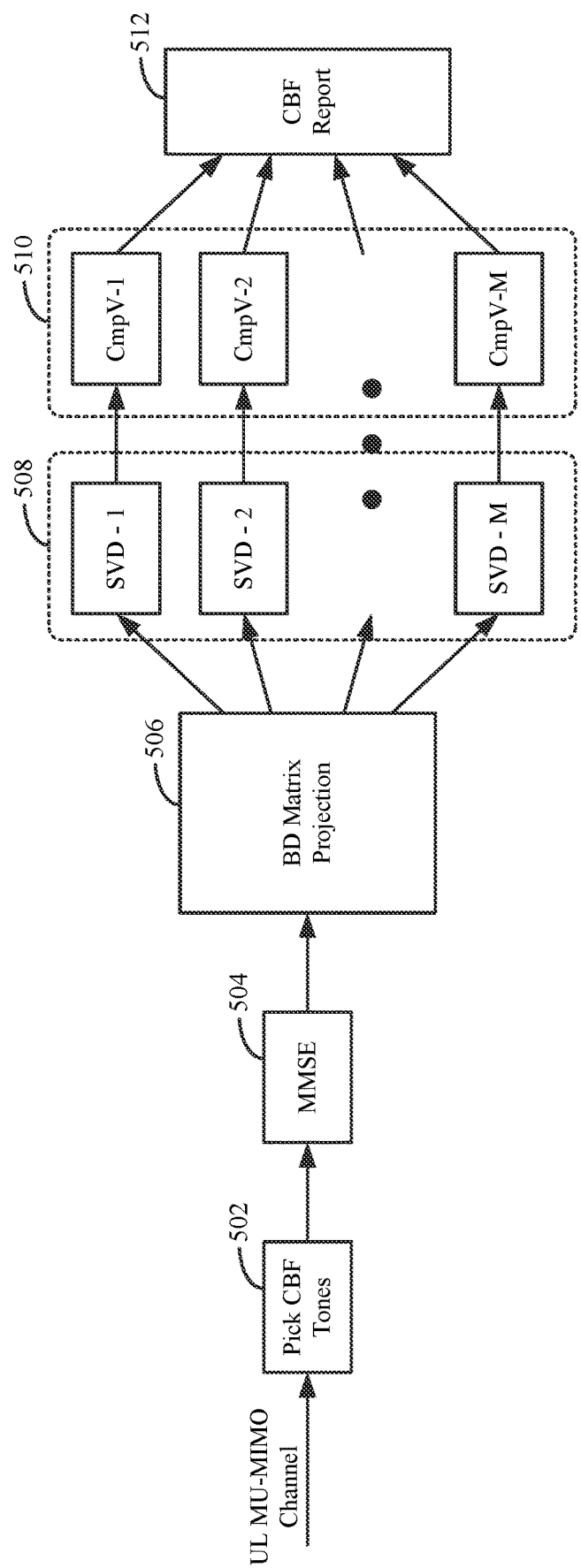
FIG. 5 shows a block diagram illustrating an example beamforming feedback generation procedure.

FIG. 5 shows a block diagram illustrating an example beamforming feedback generation procedure 500. According to the beamforming feedback generation procedure 500, compressed beamforming feedback (CBF) tones for a UL MU-MIMO channel can be selected at 502. Following MMSE processing at 504, a block diagonal (BD) matrix projection can be performed at 506 for a plurality of users (STAs) 1 to M. Here, the BD matrix projection may act as null space projection or equivalent to help reduce inter-user and inter-stream interference. For each of the users (STAs) 1 to M, singular value decomposition (SVD) can be performed at 508 for the plurality of subcarriers (tones) selected in block 502 to obtain a respective compressed V matrix (Cmp-V) at 510. Based on the component vectors at 510, a compressed beamforming feedback report can be generated at 512. It can be noted that, in some embodiments, the CBF report generated in 512 may contain a separate beamforming feedback report for users (STAs) 1 to M, which may be encapsulated together to be sent together in the subsequent frame to the users (STAs) or may be sent individually over subsequent frames. It can also be noted that in one embodiment SVD may be substituted by other channel decomposition algorithms such as EVD (Eigen Value Decomposition) or QR decomposition.

Figure 6:
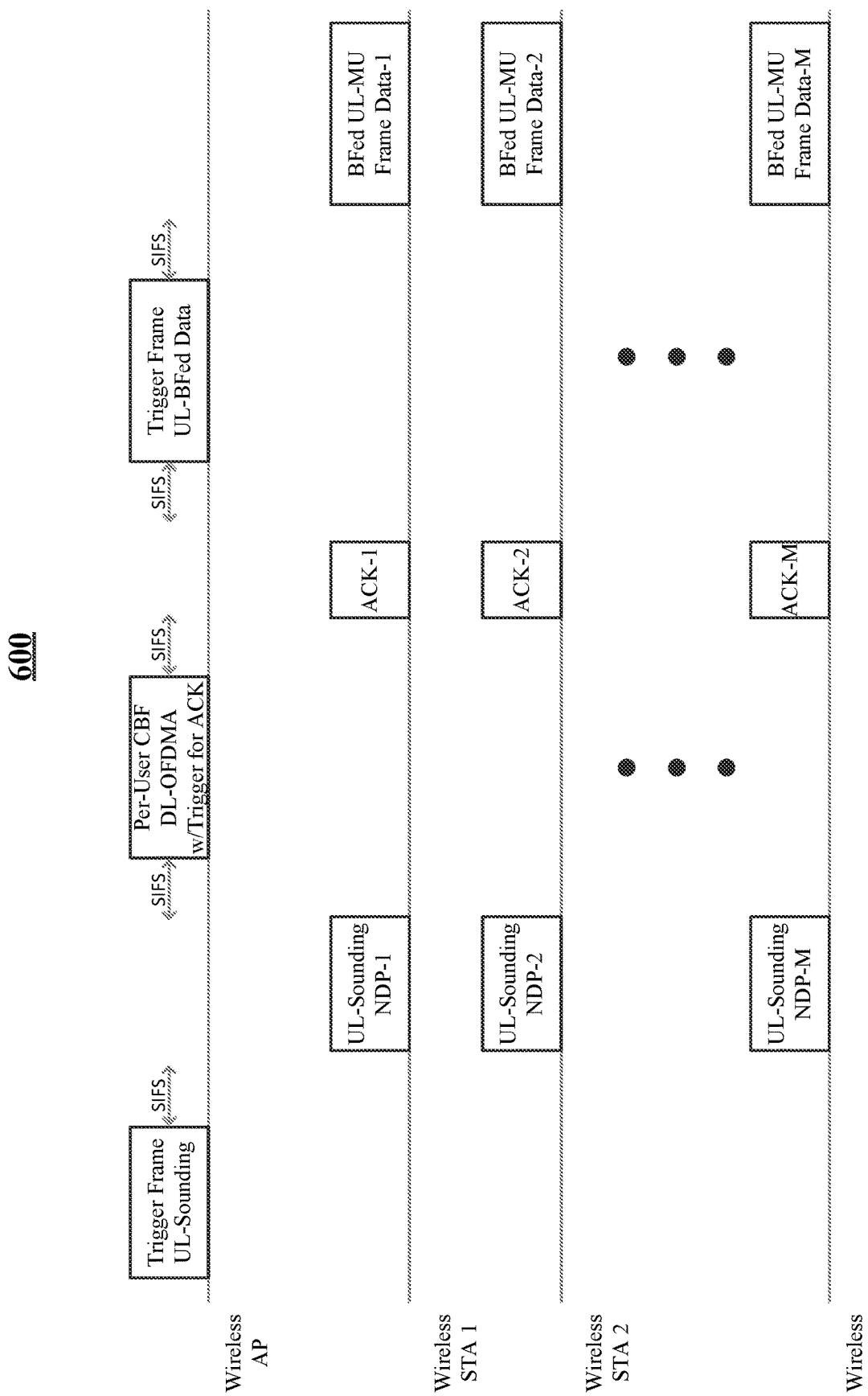
FIG. 6 shows a communication diagram illustrating an example communication exchange.

FIG. 6 shows a communication diagram illustrating an example communication exchange 600. According to communication exchange 600, a wireless AP can transmit a trigger frame for UL sounding. In response to the trigger frame, a plurality of wireless STAs 1 to M can concurrently transmit respective UL sounding packets—which can be null data packets (NDPs)—to the wireless AP. The wireless AP can then transmit per-user compressed beamforming feedback (CBF) to the wireless STAs. In some examples, the wireless AP can transmit the per-user CBF in a downlink (DL) orthogonal frequency division multiple access (OFDMA) mode. In some examples, the per-user CBF can include an acknowledgment trigger, and the wireless STAs can transmit respective acknowledgments to the wireless AP to acknowledge receipt of the per-user CBF. The wireless AP can subsequently transmit a trigger frame to cause the wireless STAs to perform UL beamformed data transmission according to beamforming feedback provided to them in the per-user CBF.

Figure 7:
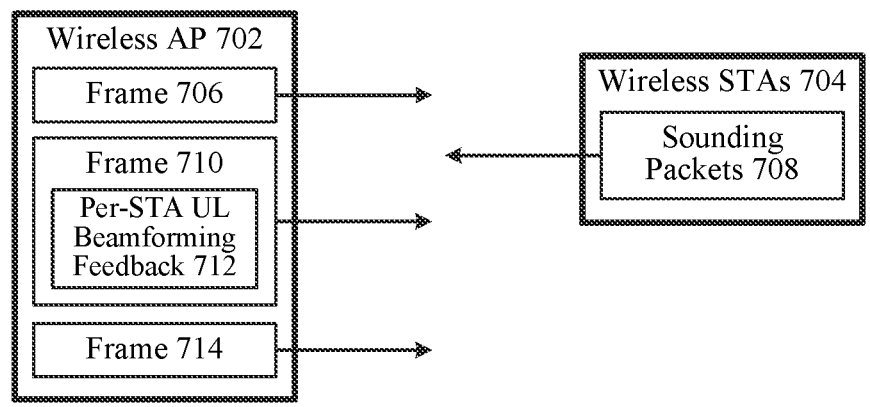
FIG. 7 shows a block diagram illustrating an example operating environment.

FIG. 7 shows a block diagram illustrating an example operating environment 700. In the operating environment 700, a wireless AP 702 can implement UL MU-MIMO precoding using per-STA feedback in supporting of beamforming on the part of one or more wireless STAs 704. According to aspects of the disclosure, in the operating environment 700, the wireless AP 702 can implement the beamforming feedback generation procedure 500 of FIG. 5. According to aspects of the disclosure, in the operating environment 700, the wireless AP 702 can communicate with the wireless STAs 704 in accordance with the communication exchange 600 of FIG. 6.

In the operating environment 700, the wireless AP 702 can support precoding according to a UL MU-MIMO minimum mean square error (MMSE) precoding model. According to the UL MU-MIMO MMSE precoding model, for a subcarrier k, for a total of M users, an estimated channel can be represented by an estimated channel matrix $H^k$ according to Equation (1) as follows:

$$H^k = \begin{bmatrix} H_1^k & \ldots & H_m^k \end{bmatrix} \in N_r \times \sum_{m=1}^{N} N_{t,m} \quad (1)$$

where $N_{t,m}$ represents the number of transmit antennas of the $m^{th}$ user.

The pseudo-inverse of the estimated channel matrix $H^k$ can be represented by $G^k$ according to Equation (2) as follows:

$$G^k = H^{k,*}(H^k H^{k,*})^{-1} = \begin{bmatrix} \tilde{G}_1^k \\ \vdots \\ \tilde{G}_M^k \end{bmatrix} \in \sum_{m=1}^{M} N_{t,m} \times N_r \quad (2)$$

$G^k H^k$ (which may correspond to the plurality of modified channel matrices described elsewhere herein) can then be written explicitly according to Equation (3) as follows:

$$G^k H^k = \begin{bmatrix} \breve{G}_1^k \\ \vdots \\ \breve{G}_M^k \end{bmatrix} \begin{bmatrix} H_1^k & \cdots & H_m^k \end{bmatrix} = \begin{bmatrix} \breve{G}_1^k H_1^k & \cdots & \breve{G}_1^k H_M^k \\ \vdots & \ddots & \vdots \\ \breve{G}_M^k H_1^k & \cdots & \breve{G}_M^k H_M^k \end{bmatrix} \quad (3)$$

For each of users m=1 to M, wireless AP 702 can find the respective subspace basis of $\breve{G}_m^k H_m^k$ and feedback the corresponding unitary matrix or compressed angular representation of the unitary matrix to the wireless STA 704 corresponding to the user m.

According to aspects of the disclosure, this process may correspond to the beamforming feedback generation procedure 500 of FIG. 5, described above. In some examples, the determination of the pseudo-inverse of the estimated channel matrix using Equation (2) may correspond to MMSE 504. In some examples, this estimated channel matrix pseudo-inverse may be replaced with the regularized MMSE inverse, or linear equalizer. In some examples, the determination of $G^k H^k$ may correspond to the BD Matrix Projection 506 in which $G^k H^k$ the channel equalizer matrix for a channel associated with a subcarrier k ($G^k$) is multiplied with a channel matrix associated with that subcarrier ($H^k$). Put differently, $G^k H^k$ may represent a respective projection of each channel matrix for each of the plurality of wireless STAs ($H^k$) in accordance with a respective linear equalizer ($G^k$). The unitary matrix for a given user, m, may be obtained by, for example, applying SVD to the corresponding block diagonal component of $G^k H^k$, $\breve{G}_m^k H_m^k$, as indicated at 508 of FIG. 5. In some examples, the unitary matrix may be compressed. In some examples, this compression may utilize cmpV format, as indicated at 510 of FIG. 5.

According to aspects of the disclosure, the wireless AP 702 can transmit a frame 706 on a wireless channel between the wireless AP 702 and the wireless STAs 704 in conjunction with UL MU-MIMO beamforming in the operating environment 700. In some examples, the frame 706 can be a trigger frame. According to aspects of the disclose, the frame 706 can identify the wireless STAs 704 as a plurality of wireless STAs that are to perform UL sounding of the wireless channel.

According to aspects of the disclosure, the wireless AP 702 can receive via the wireless channel, associated with the transmission of the frame 706, multiple sounding packets 708. In some examples, the sounding packets 708 can include a respective sounding packet 708 from each of the wireless STAs 704.

According to aspects of the disclosure, the wireless AP 702 can transmit a frame 710 on the wireless channel associated with the receipt of the sounding packets 708. In some examples, the frame 710 can include per-STA UL beamforming feedback 712 for a wireless STA 704 among the wireless STAs 704. In some examples, the frame 710 can include a compressed beamforming report field that includes the per-STA UL beamforming feedback 712. In some examples, the frame 710 can be a compressed beamforming/channel quality indication (CQI) frame. In some examples, the frame 710 can include an acknowledgment trigger. In some examples, the per-STA UL beamforming feedback 712 for the wireless STA 704 can include a plurality of compressed beamforming matrices, where each of the plurality of compressed beamforming feedback matrices is associated with a respective one of a plurality of subcarriers of the wireless channel. In some such examples, the compressed beamforming feedback matrices can be ordered according to the frequencies of their associated subcarriers, from lowest frequency to highest frequency. In some examples, each of the plurality of compressed beamforming feedback matrices can include a respective angle sequence (for example, for a Givens rotation). In some examples, each angle sequence can be a sequence of angles including $\phi$ angles and $\psi$ angles.

According to aspects of the disclosure, the wireless AP 702 can obtain the plurality of compressed beamforming feedback matrices with reference to block diagonal components of a plurality of modified channel matrices including a respective associated modified channel matrix for each of the plurality of subcarriers. In some examples, the wireless AP 702 can obtain the plurality of compressed beamforming feedback matrices from the block diagonal components of the plurality of modified channel matrices using singular value decomposition (SVD) or QR decomposition. In some examples, a respective associated modified channel matrix for at least one of the plurality of subcarriers can include a projection of a channel equalizer matrix, or linear equalizer, for a channel associated with that subcarrier and a channel matrix associated with that subcarrier.

In some examples, the wireless AP 702 can transmit a frame 714 on the wireless channel to trigger a wireless station 704 for which it provided the per-STA UL beamforming feedback 712 to perform a beamformed UL data transmission according to the per-STA UL beamforming feedback 712.

Figure 8:
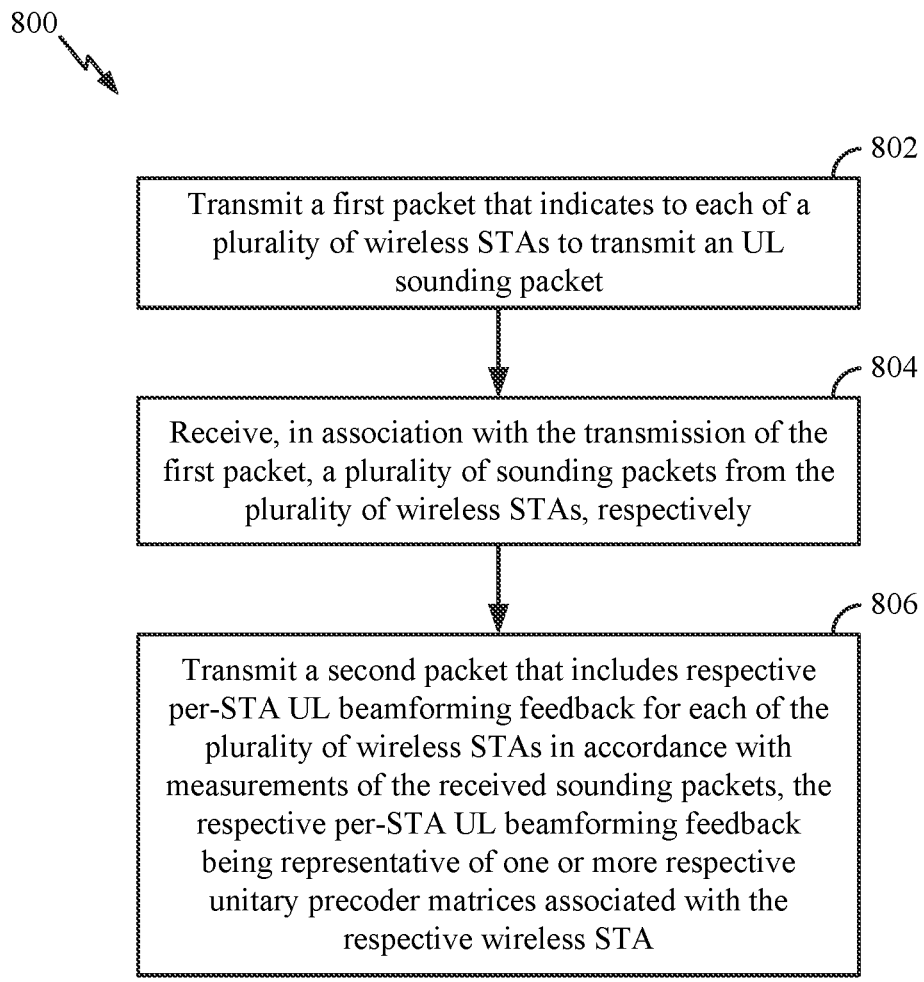
FIG. 8 shows a flowchart illustrating an example process performable by or at a wireless AP that supports UL MU-MIMO precoding using per-STA feedback.

FIG. 8 shows a flowchart illustrating an example process 800 performable by or at a wireless AP that supports UL MU-MIMO precoding using per-STA feedback. The operations of the process 800 may be implemented by a wireless AP or its components as described herein. For example, the process 800 may be performed by a wireless communication device, such as the wireless communication device 900 described with reference to FIG. 9, operating as or within a wireless AP. In some examples, the process 800 may be performed by a wireless AP such as one of the APs 102 described with reference to FIG. 1.

In some examples, in block 802, the wireless AP can transmit a first packet that indicates to each of a plurality of wireless STAs to transmit an UL sounding packet. For example, in the operating environment 700 of FIG. 7, the wireless AP 702 can transmit the frame 706 on the wireless channel between the wireless AP 702 and the wireless STAs 704, and the frame 706 can identify the wireless STAs 704 as a plurality of wireless STAs that are to perform UL sounding of the wireless channel. In some examples, the first packet can include a trigger configured to cause the plurality of wireless STAs to transmit the plurality of sounding packets. As such, in some examples, the first frame (for example, frame 706) can be a trigger frame.

In some examples, in block 804, the wireless AP can receive in association with the transmission of the first packet, a plurality of sounding packets from the plurality of wireless STAs, respectively. For example, in the operating environment 700 of FIG. 7, the wireless AP 702 can receive, via the wireless channel between the wireless AP 702 and the wireless STAs 704, the sounding packets 708, and the sounding packets 708 can include a respective sounding packet 708 from each of the wireless STAs 704.

In some examples, in block 806, the wireless AP can transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA. For example, in the operating environment 700 of FIG. 7, the wireless AP 702 can transmit the frame 710 on the wireless channel between the wireless AP 702 and the wireless STAs 704 associated with the receipt of the sounding packets 708, and the frame 710 can comprise a packet that includes per-STA UL beamforming feedback 712 for a wireless STA 704 among the wireless STAs 704.

In some examples, the wireless AP can perform the measurements of the plurality of sounding packets over a plurality of subcarriers; obtain a respective channel matrix for each of the plurality of subcarriers in accordance with the measurements; obtain a respective projection of each channel matrix for each of the plurality of wireless STAs in accordance with a respective linear equalizer; and obtain the one or more respective unitary precoder matrices associated with each of the plurality of wireless STAs in accordance with respective block diagonal components of the respective projections. For example, in the operating environment 700 of FIG. 7, the wireless AP 702 can perform measurements of the plurality of sounding packets 708 over a plurality of subcarriers, k, and for a total of M STAs 704. The wireless AP 702 can then obtain a respective channel matrix, $H^k$, for each of the plurality of subcarriers in accordance with the measurements, and obtain a respective projection of each channel matrix, $G^k H^k$, for each of the plurality of wireless STAs in accordance with a respective linear equalizer, $G^k$, in the manner described above with respect to BD Matrix Projection 506 of FIG. 5, for example. The wireless AP 702 can then obtain the one or more respective unitary precoder matrices associated with each of the plurality of wireless STAs in accordance with respective block diagonal components of the respective projections.

In some examples, the wireless AP can compress the one or more respective unitary precoder matrices associated with each of the plurality of wireless STAs using a respective Givens rotation operation to generate respective angles, wherein the per-STA UL beamforming feedback includes the respective angles. In some examples, the wireless AP can obtain the one or more respective unitary precoder matrices associated with each of the plurality of wireless STAs, the processing system is configured to cause the wireless AP to perform a singular value decomposition (SVD), Eigen Value Decomposition (EVD) or QR decomposition operation on the respective block diagonal components of the respective projections. In some examples, the respective projection of each channel matrix for each of the plurality of wireless STAs comprises a null space matrix projection. In some examples, the null space matrix projection comprises a null space block diagonal matrix projection.

In some examples, the second packet includes a respective compressed beamforming report field for each of the plurality of wireless STAs that includes the per-STA UL beamforming feedback for the plurality of wireless stations. In some examples, the second packet further includes a respective per stream signal-to-noise ratio (SNR) for each of the plurality of subcarriers or an average SNR for the plurality of subcarriers for each of the plurality of wireless stations. In some examples, the respective per-STA UL beamforming feedback for each of the plurality of wireless STAs is provided in single user compressed beamforming (SU-CBF) format or multi-user compressed beamforming (MU-CBF).

In some examples, the wireless AP can transmit a third packet configured to cause the plurality of wireless STAs to concurrently transmit a multi-user (MU) multiple-input multiple-output (MIMO) communication in accordance with the per-STA UL beamforming feedback. For example, in the operating environment 700 of FIG. 7, the wireless AP 702 can transmit a trigger frame to cause the wireless STAs 704 to transmit beamformed UL-MU frame data in the manner illustrated in FIG. 6, described above.

In some examples, the wireless AP can receive a respective number of antennas of each of the plurality of wireless STAs, prior to transmitting the first frame. For example, in the operating environment 700 of FIG. 7, the wireless AP 702 and the wireless STAs 704 may have a capability exchange when the wireless STAs 704 are associating with the wireless AP 702 in which each wireless STA 704 provides the number of antennas it may use for beamformed transmissions.

In some examples, the wireless AP can transmit an indication to each of the plurality of wireless STAs, of a modification restriction for using the one or more respective unitary precoder matrices; and the indication is associated with obtaining the respective unitary precoder matrices jointly using the plurality of sounding packets from the plurality of wireless STAs. For example, in the operating environment 700 of FIG. 7, the wireless AP 702 and the wireless STAs 704 may include a flag, bit or other indication to the wireless STAs 704 to use the respective unitary precoder matrix without modification, except to the extent needed for regular beamformer operation such as phase alignment, stream weighting, etc., in a frame transmitted by the wireless AP 702, such as frames shown in FIG. 6. This can help avoid potential interference when unitary precoder matrices for all wireless STAs 704 are jointly determined using the process shown in FIG. 5, for example.

Figure 9:
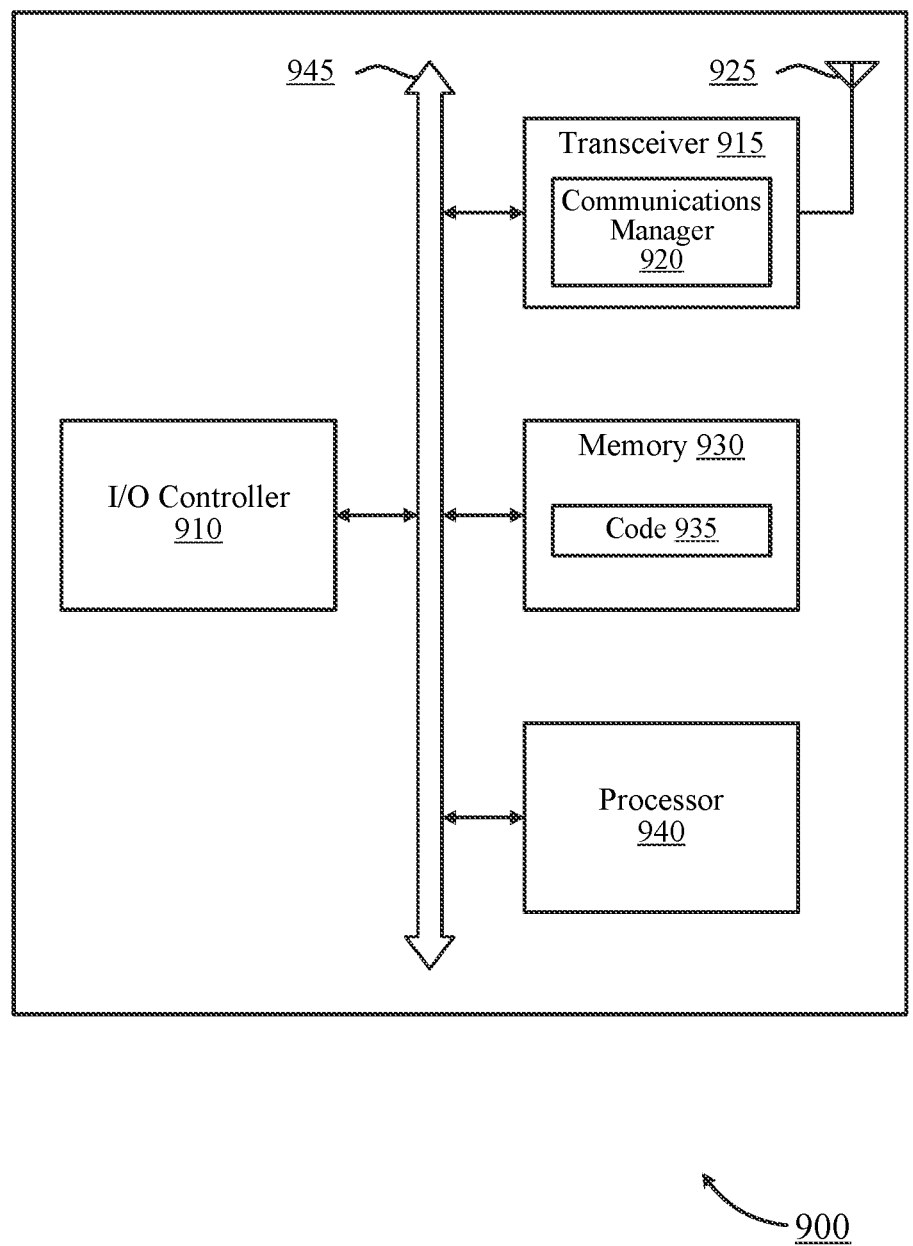
FIG. 9 shows a block diagram of an example wireless communication device that supports UL MU-MIMO precoding using per-STA feedback.

FIG. 9 shows a block diagram of an example wireless communication device 900 that supports UL MU-MIMO precoding using per-STA feedback. In some implementations, the wireless communication device 900 may be configured to perform the process 800 described above with reference to FIG. 8. The wireless communication device 900 may be an example implementation of wireless AP 702 of FIG. 7. In some implementations, the wireless communication device 900 may be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory"). In some implementations, the wireless communication device 900 may be a device for use in a wireless AP, such as the wireless AP 102 described above with reference to FIG. 1. In other implementations, the wireless communication device 900 may be a wireless AP that includes such a chip, SoC, chipset package or device as well as at least one antenna.

In some implementations, the wireless communication device 900 may be capable of transmitting and receiving wireless communications in the form of, for example, wireless packets. For example, the wireless communication device may be configured or operable to transmit and receive packets in the form of physical layer PPDUs and MPDUs conforming to one or more of the IEEE 802.11 family of wireless communication protocol standards. The wireless communication device 900 may include components for bi-directional communications including components for transmitting and receiving communications, such as a communications manager 920, an input/output (I/O) controller 910, a transceiver 915, an antenna 925, a memory 930, code 935 and a processor 940. These components may be in electronic communication or otherwise coupled (such as operatively, communicatively, functionally, electronically, electrically) via one or more buses (such as a bus 945).

The I/O controller 910 may manage input and output signals for the wireless communication device 900. The I/O controller 910 also may manage peripherals not integrated into the wireless communication device 900. In some implementations, the I/O controller 910 may represent a physical connection or port to an external peripheral. In some implementations, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some implementations, the I/O controller 910 may be implemented as part of a processor or processing system, such as the processor 940. In some implementations, a user may interact with the wireless communication device 900 via the I/O controller 910 or via hardware components controlled by the I/O controller 910.

In some implementations, the wireless communication device 900 may include a single antenna 925. However, in some other implementations, the wireless communication device 900 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations associated with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (for example, the processor 940, or the memory 930, or both), may be included in a chip or chip assembly that is installed in the wireless communication device 900.

The memory 930 may include random access memory (RAM) and read-only memory (ROM). The memory 930 may store computer-readable, computer-executable code 935 including instructions that, when executed by the processor 940, cause the wireless communication device 900 to perform various functions described herein. The code 935 may be stored in a non-transitory computer-readable medium such as system memory or another type of memory. In some implementations, the code 935 may not be directly executable by the processor 940 but may cause a computer (for example, when compiled and executed) to perform functions described herein. In some implementations, the memory 930 may contain, among other things, a basic I/O system (BIOS) which may control basic hardware or software operation such as the interaction with peripheral components or devices.

The processor 940 may be any one or more suitable processors capable of executing scripts or instructions of one or more software programs stored in the wireless communication device 900 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the wireless communication device 900). For example, a processing system of the wireless communication device 900 may refer to a system including the various other components or subcomponents of the wireless communication device 900, such as the processor 940, or the transceiver 915, or the communications manager 920, or other components or combinations of components of the wireless communication device 900.

The processing system of the wireless communication device 900 may interface with other components of the wireless communication device 900, and may process information received from other components (such as inputs or signals) or output information to other components. For example, a chip or modem of the wireless communication device 900 may include a processing system, a first interface to output information and a second interface to obtain information. In some implementations, the first interface may refer to an interface between the processing system of the chip or modem and a transmitter, such that the wireless communication device 900 may transmit information output from the chip or modem. In some implementations, the second interface may refer to an interface between the processing system of the chip or modem and a receiver, such that the wireless communication device 900 may obtain information or signal inputs, and the information may be passed to the processing system. A person having ordinary skill in the art will readily recognize that the first interface also may obtain information or signal inputs, and the second interface also may output information or signal outputs.

The communications manager 920 may support wireless communication by wireless communication device 900 in accordance with examples as disclosed herein. In some implementations, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the wireless communication device 900 to perform various aspects of conflict mitigation for EMLSR links between multi-link devices as described herein, or the processor 940 and the memory 930 may be otherwise configured to perform or support such operations.

In some examples, the communications manager 920 may be configured as or otherwise support a means for transmitting a first frame on a wireless channel, the first frame identifying a plurality of wireless stations (STAs) that are to perform uplink (UL) sounding of the wireless channel.

In some examples, the communications manager 920 may be configured as or otherwise support a means for receiving via the wireless channel, associated with the transmission of the first frame, multiple sounding packets, the multiple sounding packets including a respective sounding packet from each of multiple wireless stations among the plurality of wireless stations.

In some examples, the communications manager 920 may be configured as or otherwise support a means for transmitting a second frame on the wireless channel associated with the receipt of the multiple sounding packets, the second frame including per-STA UL beamforming feedback for a wireless station among the multiple wireless stations.

Implementation examples are described in the following numbered clauses:

Clause 1. A wireless access point (AP), comprising: a processing system that includes processor circuitry and memory circuitry that stores code, the processing system configured to cause the wireless AP to: transmit a first packet that indicates to each of a plurality of wireless stations (STAs) to transmit an uplink (UL) sounding packet; receive, in association with the transmission of the first packet, a plurality of sounding packets from the plurality of wireless STAs, respectively; and transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

Clause 2. The wireless AP of clause 1, wherein the processing system is further configured to cause the wireless AP to: perform the measurements of the plurality of sounding packets over a plurality of subcarriers; obtain a respective channel matrix for each of the plurality of subcarriers in accordance with the measurements; obtain a respective projection of each channel matrix for each of the plurality of wireless STAs in accordance with a respective linear equalizer; and obtain the one or more respective unitary precoder matrices associated with each of the plurality of wireless STAs in accordance with respective block diagonal components of the respective projections.

Clause 3. The wireless AP of clause 2, wherein the processing system is further configured to cause the wireless AP to compress the one or more respective unitary precoder matrices associated with each of the plurality of wireless STAs using a respective Givens rotation operation to generate respective angles, wherein the per-STA UL beamforming feedback includes the respective angles.

Clause 4. The wireless AP of any one of clauses 2-3, wherein, to obtain the one or more respective unitary precoder matrices associated with each of the plurality of wireless STAs, the processing system is configured to cause the wireless AP to perform a singular value decomposition (SVD), Eigen Value Decomposition (EVD) or QR decomposition operation on the respective block diagonal components of the respective projections.

Clause 5. The wireless AP of any one of clauses 2-4, wherein, the respective projection of each channel matrix for each of the plurality of wireless STAs comprises a null space matrix projection.

Clause 6. The wireless AP of clause 5, wherein the null space matrix projection comprises a null space block diagonal matrix projection.

Clause 7. The wireless AP any one of clauses 1-6, wherein the first packet includes a trigger configured to cause the plurality of wireless STAs to transmit the plurality of sounding packets.

Clause 8. The wireless AP of any one of clauses 1-7, wherein the second packet includes a respective compressed beamforming report field for each of the plurality of wireless STAs that includes the per-STA UL beamforming feedback for the plurality of wireless STAs.

Clause 9. The wireless AP of any one of clauses 1-8, wherein the respective per-STA UL beamforming feedback for each of the plurality of wireless STAs is provided in single user compressed beamforming (SU-CBF) format or multi-user compressed beamforming (MU-CBF).

Clause 10. The wireless AP of any one of clauses 1-9, wherein the processing system is further configured to cause the wireless AP to transmit a third packet configured to cause the plurality of wireless STAs to concurrently transmit a multi-user (MU) multiple-input multiple-output (MIMO) communication in accordance with the per-STA UL beamforming feedback.

Clause 11. The wireless AP of any one of clauses 1-10, wherein the second packet further includes a respective per stream signal-to-noise ratio (SNR) for each of the plurality of subcarriers or an average SNR for the plurality of subcarriers for each of the plurality of wireless STAs.

Clause 12. The wireless AP of any one of clauses 1-11, wherein the processing system is configured to cause the wireless AP to receive a respective number of antennas of each of the plurality of wireless STAs, prior to transmitting the first frame.

Clause 13. The wireless AP of any one of clauses 1-12, wherein the processing system is configured to cause the wireless AP to transmit an indication to each of the plurality of wireless STAs, of a modification restriction for using the one or more respective unitary precoder matrices.

Clause 14. A method for wireless communication by a wireless access point (AP), comprising: transmitting a first packet that indicates to each of a plurality of wireless stations (STAs) to transmit an uplink (UL) sounding packet; receiving, in association with the transmission of the first packet, a plurality of sounding packets from the plurality of wireless STAs, respectively; and transmitting a second frame that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

Clause 15. The method of clause 14, further comprising: performing the measurements of the plurality of sounding packets over a plurality of subcarriers; obtaining a respective channel matrix for each of the plurality of subcarriers in accordance with the measurements; obtaining a respective projection of each channel matrix for each of the plurality of wireless STAs in accordance with a respective linear equalizer; and obtaining the one or more respective unitary precoder matrices associated with each of the plurality of wireless STAs in accordance with respective block diagonal components of the respective projections.

Clause 16. The method of clause 15, wherein further comprising compressing the one or more respective unitary precoder matrices associated with each of the plurality of wireless STAs using a respective Givens rotation operation to generate respective angles, wherein the per-STA UL beamforming feedback includes the respective angles.

Clause 17. The method of any one of clauses 15-16, wherein obtaining the one or more respective unitary precoder matrices associated with each of the plurality of wireless STAs comprises performing a singular value decomposition (SVD), Eigen Value Decomposition (EVD) or QR decomposition operation on the respective block diagonal components of the respective projections.

Clause 18. The method of any one of clauses 15-17, wherein the respective projection of each channel matrix for each of the plurality of wireless STAs comprises a null space matrix projection.

Clause 19. The method of clause 18, wherein the null space matrix projection comprises a null space block diagonal matrix projection.

Clause 20. The method of any one of clauses 14-19, wherein the first packet includes a trigger configured to cause the plurality of wireless STAs to transmit the plurality of sounding packets.

Clause 21. The method of any one of clauses 14-20, wherein the second packet includes a respective compressed beamforming report field for each of the plurality of wireless STAs that includes the per-STA UL beamforming feedback for the plurality of wireless STAs.

Clause 22. The method of any one of clauses 14-21, wherein the respective per-STA UL beamforming feedback for each of the plurality of wireless STAs is provided in single user compressed beamforming (SU-CBF) format or multi-user compressed beamforming (MU-CBF).

Clause 23. The method of any one of clauses 14-23, comprising transmitting a third packet configured to cause the plurality of wireless STAs to concurrently transmit a multi-user (MU) multiple-input multiple-output (MIMO) communication in accordance with the per-STA UL beamforming feedback.

Clause 24. The method of any one of clauses 14-23, wherein the second packet further includes a respective per stream signal-to-noise ratio (SNR) for each of the plurality of subcarriers or an average SNR for the plurality of subcarriers for each of the plurality of wireless STAs.

Clause 25. The method of any one of clauses 14-24, further comprising receiving a respective number of antennas of each of the plurality of wireless STAs, prior to transmitting the first frame.

Clause 26. The method of any one of clauses 14-25, further comprising transmitting an indication to each of the plurality of wireless STAs, of a modification restriction for using the one or more respective unitary precoder matrices.

Clause 27. An apparatus for a wireless access point (AP), comprising: means for transmitting a first packet that indicates to each of a plurality of wireless stations (STAs) to transmit an uplink (UL) sounding packet; means for receiving, in association with the transmission of the first packet, a plurality of sounding packets from the plurality of wireless STAs, respectively; and means for transmitting a second frame that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

Clause 28. The apparatus of clause 27, further comprising: means for performing the measurements of the plurality of sounding packets over a plurality of subcarriers; means for obtaining a respective channel matrix for each of the plurality of subcarriers in accordance with the measurements; means for obtaining a respective projection of each channel matrix for each of the plurality of wireless STAs in accordance with a respective linear equalizer; and means for obtaining the one or more respective unitary precoder matrices associated with each of the plurality of wireless STAs in accordance with respective block diagonal components of the respective projections.

Clause 29. The apparatus of clause 28, further comprising means for compressing the one or more respective unitary precoder matrices associated with each of the plurality of wireless STAs using a respective Givens rotation operation to generate respective angles, wherein the per-STA UL beamforming feedback includes the respective angles.

Clause 30. A non-transitory computer-readable medium storing instructions for communication by a wireless access point (AP), the instructions including code to: transmit a first packet that indicates to each of a plurality of wireless stations (STAs) to transmit an uplink (UL) sounding packet; receive, in association with the transmission of the first packet, a plurality of sounding packets from the plurality of wireless STAs, respectively; and transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

Clause 31. A wireless access point (AP), comprising: a processing system that includes processor circuitry and memory circuitry that stores code, the processing system configured to cause the wireless AP to: receive a plurality of sounding packets from a plurality of wireless stations (STAs); perform measurements of the plurality of sounding packets; for each of a plurality of subcarriers: determine a respective channel matrix associated with a subcarrier, the respective channel matrix representative of an estimated channel for the plurality of wireless STAs for the subcarrier and based on the measurements of the plurality of sounding packets; and obtain a respective equalizer matrix based on respective channel matrix associated with the subcarrier; determine a respective modified channel matrix associated with the subcarrier, the channel matrix comprising a projection of the respective channel matrix on the respective equalizer matrix; and determining a respective unitary precoder matrix for each of the plurality of wireless STAs based on diagonal components of the modified channel matrix respectively associated with the plurality of wireless STAs; and transmitting UL beamforming feedback for each of the plurality of wireless STAs, the UL beamforming feedback representative of the respective unitary precoder matrix for each of the plurality of wireless STAs.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless access point (AP), comprising:
a processing system that includes processor circuitry and memory circuitry that stores code, the processing system configured to cause the wireless AP to:
transmit a first packet that indicates to each of a plurality of wireless stations (STAs) to transmit an uplink (UL) sounding packet;
receive, in association with the transmission of the first packet, a plurality of sounding packets from the plurality of wireless STAs, respectively; and
transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

2. The wireless AP of claim 1, wherein the processing system is further configured to cause the wireless AP to:
perform the measurements of the plurality of sounding packets over a plurality of subcarriers;
obtain a respective channel matrix for each of the plurality of subcarriers in accordance with the measurements;
obtain a respective projection of each channel matrix for each of the plurality of wireless STAs in accordance with a respective linear equalizer; and
obtain the one or more respective unitary precoder matrices associated with each of the plurality of wireless STAs in accordance with respective block diagonal components of the respective projections.

3. The wireless AP of claim 2, wherein the processing system is further configured to cause the wireless AP to compress the one or more respective unitary precoder matrices associated with each of the plurality of wireless STAs using a respective Givens rotation operation to generate respective angles, wherein the per-STA UL beamforming feedback includes the respective angles.

4. The wireless AP of claim 2, wherein, to obtain the one or more respective unitary precoder matrices associated with each of the plurality of wireless STAs, the processing system is configured to cause the wireless AP to perform a singular value decomposition (SVD), Eigen Value Decomposition (EVD) or QR decomposition operation on the respective block diagonal components of the respective projections.

5. The wireless AP of claim 2, wherein, the respective projection of each channel matrix for each of the plurality of wireless STAs comprises a null space matrix projection.

6. The wireless AP of claim 5, wherein the null space matrix projection comprises a null space block diagonal matrix projection.

7. The wireless AP of claim 1, wherein the first packet includes a trigger configured to cause the plurality of wireless STAs to transmit the plurality of sounding packets.

8. The wireless AP of claim 1, wherein the second packet includes a respective compressed beamforming report field for each of the plurality of wireless STAs that includes the per-STA UL beamforming feedback for the plurality of wireless STAs.

9. The wireless AP of claim 1, wherein the respective per-STA UL beamforming feedback for each of the plurality of wireless STAs is provided in single user compressed beamforming (SU-CBF) format or multi-user compressed beamforming (MU-CBF).

10. The wireless AP of claim 1, wherein the processing system is further configured to cause the wireless AP to transmit a third packet configured to cause the plurality of wireless STAs to concurrently transmit a multi-user (MU) multiple-input multiple-output (MIMO) communication in accordance with the per-STA UL beamforming feedback.

11. The wireless AP of claim 1, wherein the second packet further includes a respective per stream signal-to-noise ratio (SNR) for each of the plurality of subcarriers or an average SNR for the plurality of subcarriers for each of the plurality of wireless STAs.

12. The wireless AP of claim 1, wherein the processing system is configured to cause the wireless AP to receive a respective number of antennas of each of the plurality of wireless STAs, prior to transmitting the first packet.

13. The wireless AP of claim 1, wherein the processing system is configured to cause the wireless AP to transmit an indication to each of the plurality of wireless STAs, of a modification restriction for using the one or more respective unitary precoder matrices; and the indication is associated with the processing system obtaining the respective unitary precoder matrices jointly using the plurality of sounding packets from the plurality of wireless STAs.

14. A method for wireless communication by a wireless access point (AP), comprising:
transmitting a first packet that indicates to each of a plurality of wireless stations (STAs) to transmit an uplink (UL) sounding packet;
receiving, in association with the transmission of the first packet, a plurality of sounding packets from the plurality of wireless STAs, respectively; and
transmitting a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

15. The method of claim 14, further comprising:
performing the measurements of the plurality of sounding packets over a plurality of subcarriers;
obtaining a respective channel matrix for each of the plurality of subcarriers in accordance with the measurements;
obtaining a respective projection of each channel matrix for each of the plurality of wireless STAs in accordance with a respective linear equalizer; and
obtaining the one or more respective unitary precoder matrices associated with each of the plurality of wireless STAs in accordance with respective block diagonal components of the respective projections.

16. The method of claim 15, wherein further comprising compressing the one or more respective unitary precoder matrices associated with each of the plurality of wireless STAs using a respective Givens rotation operation to generate respective angles, wherein the per-STA UL beamforming feedback includes the respective angles.

17. The method of claim 15, wherein obtaining the one or more respective unitary precoder matrices associated with each of the plurality of wireless STAs comprises performing a singular value decomposition (SVD), Eigen Value Decomposition (EVD) or QR decomposition operation on the respective block diagonal components of the respective projections.

18. The method of claim 15, wherein the respective projection of each channel matrix for each of the plurality of wireless STAs comprises a null space matrix projection.

19. The method of claim 18, wherein the null space matrix projection comprises a null space block diagonal matrix projection.

20. The method of claim 14, wherein the first packet includes a trigger configured to cause the plurality of wireless STAs to transmit the plurality of sounding packets.

21. The method of claim 14, wherein the second packet includes a respective compressed beamforming report field for each of the plurality of wireless STAs that includes the per-STA UL beamforming feedback for the plurality of wireless STAs.

22. The method of claim 14, wherein the respective per-STA UL beamforming feedback for each of the plurality of wireless STAs is provided in single user compressed beamforming (SU-CBF) format or multi-user compressed beamforming (MU-CBF).

23. The method of claim 14, comprising transmitting a third packet configured to cause the plurality of wireless STAs to concurrently transmit a multi-user (MU) multiple-input multiple-output (MIMO) communication in accordance with the per-STA UL beamforming feedback.

24. The method of claim 14, wherein the second packet further includes a respective per stream signal-to-noise ratio (SNR) for each of the plurality of subcarriers or an average SNR for the plurality of subcarriers for each of the plurality of wireless STAs.

25. The method of claim 14, further comprising receiving a respective number of antennas of each of the plurality of wireless STAs, prior to transmitting the first packet.

26. The method of claim 14, further comprising transmitting an indication to each of the plurality of wireless STAs, of a modification restriction for using the one or more respective unitary precoder matrices; and the indication is associated with obtaining the respective unitary precoder matrices jointly using the plurality of sounding packets from the plurality of wireless STAs.

27. An apparatus for a wireless access point (AP), comprising:
means for transmitting a first packet that indicates to each of a plurality of wireless stations (STAs) to transmit an uplink (UL) sounding packet;
means for receiving, in association with the transmission of the first packet, a plurality of sounding packets from the plurality of wireless STAs, respectively; and
means for transmitting a second packet frame that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

28. The apparatus of claim 27, further comprising:
means for performing the measurements of the plurality of sounding packets over a plurality of subcarriers;
means for obtaining a respective channel matrix for each of the plurality of subcarriers in accordance with the measurements;
means for obtaining a respective projection of each channel matrix for each of the plurality of wireless STAs in accordance with a respective linear equalizer; and
means for obtaining the one or more respective unitary precoder matrices associated with each of the plurality of wireless STAs in accordance with respective block diagonal components of the respective projections.

29. The apparatus of claim 28, further comprising means for compressing the one or more respective unitary precoder matrices associated with each of the plurality of wireless STAs using a respective Givens rotation operation to generate respective angles, wherein the per-STA UL beamforming feedback includes the respective angles.

30. A non-transitory computer-readable medium storing instructions for communication by a wireless access point (AP), the instructions including code to:
  transmit a first packet that indicates to each of a plurality of wireless stations (STAs) to transmit an uplink (UL) sounding packet;
  receive, in association with the transmission of the first packet, a plurality of sounding packets from the plurality of wireless STAs, respectively; and
  transmit a second packet that includes respective per-STA UL beamforming feedback for each of the plurality of wireless STAs in accordance with measurements of the received sounding packets, the respective per-STA UL beamforming feedback being representative of one or more respective unitary precoder matrices associated with the respective wireless STA.

* * * * *